US011600108B2

(12) United States Patent
Shuster

(10) Patent No.: US 11,600,108 B2
(45) Date of Patent: Mar. 7, 2023

(54) VIDEO AND STILL IMAGE DATA ALTERATION TO ENHANCE PRIVACY

(71) Applicant: Gary S. Shuster, Vancouver (CA)

(72) Inventor: Gary S. Shuster, Vancouver (CA)

(*) Notice: Subject to any disclaimer, the term of this patent is extended or adjusted under 35 U.S.C. 154(b) by 38 days.

(21) Appl. No.: 17/392,109

(22) Filed: Aug. 2, 2021

(65) Prior Publication Data
US 2021/0365670 A1  Nov. 25, 2021

Related U.S. Application Data

(63) Continuation of application No. 16/292,216, filed on Mar. 4, 2019, now Pat. No. 11,080,513, which is a
(Continued)

(51) Int. Cl.
*G06K 9/00* (2022.01)
*G06V 40/16* (2022.01)
*H04L 9/40* (2022.01)
*H04W 12/02* (2009.01)
*G06F 21/62* (2013.01)
(Continued)

(52) U.S. Cl.
CPC .......... *G06V 40/16* (2022.01); *G06F 21/6245* (2013.01); *G06K 9/00* (2013.01); *G06V 40/174* (2022.01); *G06V 40/25* (2022.01); *H04L 63/0407* (2013.01); *H04W 12/02* (2013.01);
(Continued)

(58) Field of Classification Search
CPC ...... G06V 40/16; G06V 40/174; G06V 40/25; G06V 40/53; G06F 21/6245; G06F 21/32; G06K 9/00; H04L 63/0407; H04W 12/02; G07C 2209/12
See application file for complete search history.

(56) References Cited

U.S. PATENT DOCUMENTS 7,227,893 B1 * 6/2007 Srinivasa ......... G08B 13/19602
348/169
7,454,498 B2   11/2008 Shuster
(Continued)

OTHER PUBLICATIONS

Kantarcioglu, Murat and Clifton, Chris; "Privacy-Preserving Distributed Mining of Association Rules on Horizontally Partitioned Data"; IEEE Transactions on Knowledge and Data Engineering; Sep. 2004; pp. 1026-1037; vol. 16, No. 9; IEEE Computer Society.
(Continued)

*Primary Examiner* — Shervin K Nakhjavan
(74) *Attorney, Agent, or Firm* — Sherrie Flynn; Coleman & Horowitt LLP

(57) ABSTRACT

A computer alters at least one recognizable metric or text in a digitally encoded photographic image by operating an alteration algorithm in response to user input data while preserving an overall aesthetic quality of the image and obscuring an identity of at least one individual or geographic location appearing in the image. An altered digitally-encoded photographic image prepared by the altering of the at least one recognizable metric or text in the image is stored in a computer memory. User feedback and/or automatic analysis may be performed to define parameter values of the alteration algorithm such that the alteration process achieves preservation of aesthetic qualities while obscuring an identity of interest.

6 Claims, 3 Drawing Sheets

Related U.S. Application Data continuation-in-part of application No. 15/665,216, filed on Jul. 31, 2017, now Pat. No. 10,223,576, which is a continuation of application No. 14/853,782, filed on Sep. 14, 2015, now Pat. No. 9,721,144, which is a continuation of application No. 14/294,047, filed on Jun. 2, 2014, now Pat. No. 9,135,493, which is a continuation of application No. 13/349,546, filed on Jan. 12, 2012, now Pat. No. 8,744,119.

(60) Provisional application No. 61/431,965, filed on Jan. 12, 2011.

(51) Int. Cl.
  *G06V 40/20* (2022.01)
  *G06F 21/32* (2013.01)
  *G06V 40/50* (2022.01)

(52) U.S. Cl.
  CPC .............. *G06F 21/32* (2013.01); *G06V 40/53* (2022.01); *G07C 2209/12* (2013.01)

(56) References Cited

U.S. PATENT DOCUMENTS

| | | | |
|---|---|---|---|
| 7,624,277 B1 | 11/2009 | Simard et al. | |
| 8,180,112 B2* | 5/2012 | Kurtz | G06V 40/50 |
| | | | 382/116 |
| 8,334,906 B2* | 12/2012 | Lipton | H04N 7/18 |
| | | | 348/169 |
| 8,392,986 B1 | 3/2013 | Gossweiler, III | |
| 8,447,272 B2* | 5/2013 | Faith | H04W 12/06 |
| | | | 455/418 |
| 8,472,667 B2 | 6/2013 | Suzuki | |
| 8,514,236 B2* | 8/2013 | Kobla | G06V 40/103 |
| | | | 345/547 |
| 8,516,606 B2 | 8/2013 | Dorfman | |
| 8,624,900 B2 | 1/2014 | Jones et al. | |
| 8,705,811 B1 | 4/2014 | Brunner | |
| 8,744,119 B2 | 6/2014 | Shuster | |
| 8,854,182 B2* | 10/2014 | Lobean | G06V 40/25 |
| | | | 340/5.83 |
| 8,893,034 B2 | 11/2014 | King | |
| 8,978,121 B2 | 3/2015 | Shuster | |
| 9,030,486 B2* | 5/2015 | Boker | G06T 9/001 |
| | | | 345/473 |
| 9,135,493 B2 | 9/2015 | Shuster | |
| 10,006,896 B2* | 6/2018 | Fernstrom | G01N 33/02 |
| 10,973,440 B1* | 4/2021 | Martin | G06T 13/40 |
| 2004/0001220 A1 | 1/2004 | Gorday et al. | |
| 2004/0073439 A1 | 4/2004 | Shuster | |
| 2004/0228503 A1* | 11/2004 | Cutler | G06V 40/25 |
| | | | 382/103 |
| 2005/0229251 A1 | 10/2005 | Chellapilla et al. | |
| 2005/0286799 A1 | 12/2005 | Huang et al. | |
| 2006/0018516 A1* | 1/2006 | Masoud | G06T 7/254 |
| | | | 382/115 |
| 2006/0120564 A1* | 6/2006 | Imagawa | G06V 40/20 |
| | | | 382/103 |
| 2007/0064979 A1 | 3/2007 | Chhibber et al. | |
| 2007/0122005 A1 | 5/2007 | Kage et al. | |
| 2007/0127788 A1 | 6/2007 | Kakinuma et al. | |
| 2007/0237421 A1 | 10/2007 | Luo et al. | |
| 2007/0258656 A1 | 11/2007 | Aarabi | |
| 2007/0263907 A1* | 11/2007 | McMakin | G06V 40/25 |
| | | | 382/107 |
| 2008/0066014 A1 | 3/2008 | Misra | |
| 2008/0085051 A1 | 4/2008 | Yoshii et al. | |
| 2008/0292144 A1 | 11/2008 | Kim | |
| 2009/0041310 A1 | 2/2009 | Yang et al. | |
| 2009/0141933 A1* | 6/2009 | Wagg | G06T 7/75 |
| | | | 382/100 |
| 2009/0141947 A1 | 6/2009 | Kyyko et al. | |
| 2009/0262987 A1 | 10/2009 | Ioffe et al. | |
| 2010/0157129 A1 | 6/2010 | Lee | |
| 2010/0172567 A1* | 7/2010 | Prokoski | G06K 9/00 |
| | | | 348/47 |
| 2010/0172580 A1 | 7/2010 | Takenouchi et al. | |
| 2010/0328436 A1* | 12/2010 | Skubic | A61B 5/0022 |
| | | | 348/47 |
| 2012/0070042 A1 | 3/2012 | Ioffe et al. | |
| 2012/0093355 A1 | 4/2012 | Levien et al. | |
| 2013/0139258 A1* | 5/2013 | Tegreene | A61B 5/164 |
| | | | 726/22 |
| 2013/0336547 A1* | 12/2013 | Komogortsev | A61B 5/163 |
| | | | 382/117 |
| 2014/0015978 A1* | 1/2014 | Smith | G07B 15/02 |
| | | | 348/156 |
| 2014/0119642 A1* | 5/2014 | Lee | G06V 40/162 |
| | | | 382/159 |
| 2014/0161421 A1* | 6/2014 | Shoemaker | G06T 7/0016 |
| | | | 386/278 |
| 2014/0261887 A1* | 9/2014 | Groot | F28F 9/00 |
| | | | 141/383 |
| 2014/0357312 A1* | 12/2014 | Davis | G06V 20/20 |
| | | | 455/550.1 |
| 2015/0109442 A1* | 4/2015 | Derenne | H04N 7/185 |
| | | | 348/143 |
| 2015/0196231 A1* | 7/2015 | Ziaie | A61B 5/112 |
| | | | 600/595 |
| 2015/0220777 A1* | 8/2015 | Kauffmann | G06V 40/10 |
| | | | 382/103 |
| 2015/0254447 A1* | 9/2015 | Leuthardt | G06Q 30/0271 |
| | | | 726/19 |
| 2015/0286854 A1* | 10/2015 | Raducan | G06V 40/197 |
| | | | 382/117 |
| 2015/0373320 A1* | 12/2015 | Ackerson | G06T 17/00 |
| | | | 348/44 |
| 2017/0091570 A1* | 3/2017 | Rao | G06V 40/162 |
| 2017/0095192 A1* | 4/2017 | Sadowsky | A61B 5/0205 |
| 2017/0243057 A1* | 8/2017 | Wu | G06V 40/10 |
| 2017/0243354 A1* | 8/2017 | Tafazzoli | A61B 5/7275 |
| 2018/0052971 A1* | 2/2018 | Hanina | G16H 10/60 |
| 2018/0109703 A1* | 4/2018 | Steffanson | H04N 5/2253 |
| 2018/0167547 A1* | 6/2018 | Casey | G06V 20/52 |
| 2018/0268240 A1* | 9/2018 | Loce | G06F 21/6245 |
| 2019/0090786 A1* | 3/2019 | Kim | G06N 3/08 |
| 2019/0231231 A1* | 8/2019 | Saria | G06V 40/25 |
| 2019/0370561 A1* | 12/2019 | Wu | G06Q 30/0207 |
| 2019/0377970 A1* | 12/2019 | Huber, Jr. | G06V 30/19067 |
| 2020/0211154 A1* | 7/2020 | Ng | G06N 3/08 |
| 2020/0238952 A1* | 7/2020 | Lindsay | B60R 25/40 |

OTHER PUBLICATIONS

Newton, Elaine M., Sweeney, Latanya, and Malin, Bradley; "Preserving Privacy by De-Identifying Face Images", IEEE Transactions on Knowledge and Data Engineering; Feb. 2005; pp. 232-243; vol. 17, No. 2; IEEE Computer Society.

* cited by examiner

VIDEO AND STILL IMAGE DATA ALTERATION TO ENHANCE PRIVACY

CROSS-REFERENCE TO RELATED APPLICATION

This application claims priority to and is a continuation of U.S. patent application Ser. No. 16/292,216, filed Mar. 4, 2019 (now U.S. Pat. No. 11,080,513, to be issued Aug. 3, 2021), which is a continuation-in-part of U.S. patent application Ser. No. 15/665,216, filed Jul. 31, 2017 (U.S. Pat. No. 10,223,576, issued Mar. 5, 2019), which is a continuation of U.S. patent application Ser. No. 14/853,782, filed Sep. 14, 2015 (U.S. Pat. No. 9,721,144, issued Aug. 1, 2017), which is a continuation of U.S. patent application Ser. No. 14/294, 047, filed Jun. 2, 2014 (U.S. Pat. No. 9,135,493, issued Sep. 15, 2015), which is a continuation of U.S. patent application Ser. No. 13/349,546, filed Jan. 12, 2012 (U.S. Pat. No. 8,744,119, issued Jun. 3, 2014), which claims priority to U.S. Provisional Patent Application Ser. No. 61/431,965, filed Jan. 12, 2011, all of which are hereby incorporated by reference in their entireties.

FIELD OF INVENTION

This application relates to methods and systems for image data processing and image sharing over a network.

DESCRIPTION OF THE BACKGROUND

Anonymity on the internet is being destroyed by technology that allows searching databases of images for people. There are services such as "tineye" that find duplicate photographs, and technology such as Google's Picasa are capable of going much further, identifying a person in a photograph and then finding them in other photographs. For example, a Congressman's swearing-in photo might be used to develop the set of facial characteristics that are then looked for in other pictures, leading to the location of otherwise obscurely located embarrassing bachelor party pictures. See also the U.S. patent on the subject, "Method and Apparatus for Photograph Finding", U.S. Pat. No. 7,454,498 and related continuations. It would be desirable for people who publish personal images on computer networks to conveniently ensure that posted images will not be subject to undesired image recognition applications, but solutions to provide such protection while still enabling online sharing of personal image data are either currently unavailable or suffer from substantial limitations in convenience or effectiveness.

In addition to recognizing elements of still images, automated analysis of moving images can be used to identify a person via techniques such as gait recognition. One advantage of using body shape, characteristics and/or gait as a basis for identification of a person in a moving image is that the resolution necessary for recognition is reduced, allowing identification of persons at a far greater distance, with inferior focus, or in the background of a video.

SUMMARY OF THE INVENTION

Methods and systems for image processing to protect specified personal identities or geographic locations from automatic recognition, or graphic data alteration to enhance online privacy, are described in detailed in the detailed description, and certain aspects are described or summarized below. This summary and the following detailed description should be interpreted as complementary parts of an integrated disclosure, which parts may include redundant subject matter and/or supplemental subject matter. Omissions in either section do not indicate priority or relative importance of any element described in the integrated application. Differences between the sections may include supplemental disclosures of alternative embodiments or additional details, or alternative descriptions of identical embodiments using different terminology, depending on the nature of the differences.

In an aspect, a method for graphic data alteration to enhance online privacy may include a number of steps, all of which may be performed by a computer, either automatically or semi-automatically. The method may include altering at least one recognizable metric or text in a digitally-encoded photographic image by a computer operating an alteration algorithm in response to user input data while preserving an overall aesthetic quality of the image and obscuring an identity of at least one individual or geographic location appearing in the image. The method may further include storing, in a computer memory, an altered digitally-encoded photographic image prepared by the altering of the at least one recognizable metric or text in the digitally-encoded photographic image. Altering the image may include altering selected facial recognition metrics. In addition, or in the alternative, altering the image may include scrambling text.

As used herein, an "aesthetic quality" means a quality determined by the subjective taste of an individual human being, or collectively by an aggregate of subjective tastes of a group of individual human beings. An aesthetic quality may be measured using an input-output processing machine, such as a computer, collecting user input from user input devices that is correlated to machine outputs such as graphic displays of a set of images under consideration. A heuristic aesthetic quality measuring algorithm may be trained by human inputs to recognize values for a set of image parameters that an individual person, or a group of persons will subjectively perceive as preserving an overall aesthetic quality of an image. Such a heuristic aesthetic quality measuring algorithm, after an initial training period, may be used to provide input for automatic control of alterations to images so as to preserve an overall aesthetic quality of the images, with or without further user feedback, for an individual user or a group of users.

In another aspect, the method may include controlling at least one parameter of the alteration algorithm so as to obscure the identity from automatic recognition by an image recognition algorithm to below a defined minimum confidence level. In addition, the method may include modifying at least one parameter of the alteration algorithm in response to user input specifying the desired confidence level.

User feedback may be used to train a heuristic algorithm so as to produce altered images that preserve a desired aesthetic quality of an image while obscuring an identity, for example a personal identity that is recognizable using a facial recognition algorithm. Accordingly, a method may include publishing the altered image in an electronic medium, and receiving user feedback data, by a computer server via a communications network, regarding at least one of whether (a) the overall aesthetic quality of the image is preserved by the altered image or (b) the identity is obscured in the altered image. The method may further include modifying at least one parameter of the alteration algorithm in response to the user feedback data. The method may further include repeating the altering at least one recognizable metric or text in the digitally-encoded photographic image, based on a modified parameter of the alteration algorithm from the modifying at least one parameter of the alteration algorithm.

In another aspect, the method may include defining an alteration algorithm for the altering so as to obscure the identity from automatic recognition using a minimal value of $$\Delta = \sum_{1 to M} \bar{\partial} i$$

wherein $\bar{\partial}1$ is a measure of metric alteration each of for a number M of different facial recognition metrics. The method may further include selecting the number M of metrics so as to lower each applied $\bar{\partial}1$ to below a human-perceptible threshold. For example, the number M may be increased, thereby causing an increased number of alterations on a image, while the amount of each alteration is decreased. To use a simple example, instead of changing an amount of separation between eyes on a face by at least 10% to prevent automatic facial recognition (i.e., M=1 and $\bar{\partial}1 > \pm 10\%$), the alteration may change an amount of separation between the eyes by a lesser amount, and may also change some other metric, for example the width of the mouth (e.g., M=2 and $\bar{\partial}1 < \pm 10\%$).

In an alternative aspect, the method may include identifying a recognition parameter set based on the recognition algorithm, wherein the recognition parameter set is defined by a set of parameter range values outside of which the recognition algorithm cannot recognize the identity above the defined minimum confidence level. In such case, the method may further include defining parameter values for the alteration algorithm used in the altering of the image within the recognition parameter set. In addition, the method may further include controlling at least one parameter of the alteration algorithm so as to preserve an overall aesthetic quality of the image as determined by an aesthetic quality measuring algorithm to above a defined minimum preservation level. The aesthetic quality measuring algorithm may be a heuristically trained algorithm that has previously been trained by user feedback over a sample set of images. The method may further include identifying an aesthetic preservation parameter set based on the aesthetic quality measuring algorithm, wherein the aesthetic preservation parameter set is defined by a set of parameter range values outside of which the aesthetic quality measuring algorithm determines that the aesthetic quality of the image has changed in an amount that exceeds the defined minimum preservation level. The method may further include determining a third set of parameter values by a set difference of the aesthetic preservation parameter set and the recognition parameter set, wherein the set difference is defined as parameter values that are members of the aesthetic preservation parameter set and are not members of the recognition parameter set.

In related aspects, an apparatus for graphic data alteration to enhance online privacy may include a processor coupled to a memory and a network interface, the memory holding instructions that when executed by the processor cause the apparatus to perform any of the methods and aspects of the methods summarized above or described elsewhere herein. Certain aspects of such apparatus (e.g., hardware aspects) may be exemplified by equipment such as a network interface for network communications. Similarly, an article of manufacture may be provided, including a non-transitory computer-readable storage medium holding encoded instructions, which when executed by a processor, may cause a specialty device configured as an image processing server or client node to perform ones of the methods and aspects of the methods described herein.

Further embodiments, aspects and details of the method and apparatus for graphic data alteration to enhance online privacy are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

DETAILED DESCRIPTION

Figure 1:
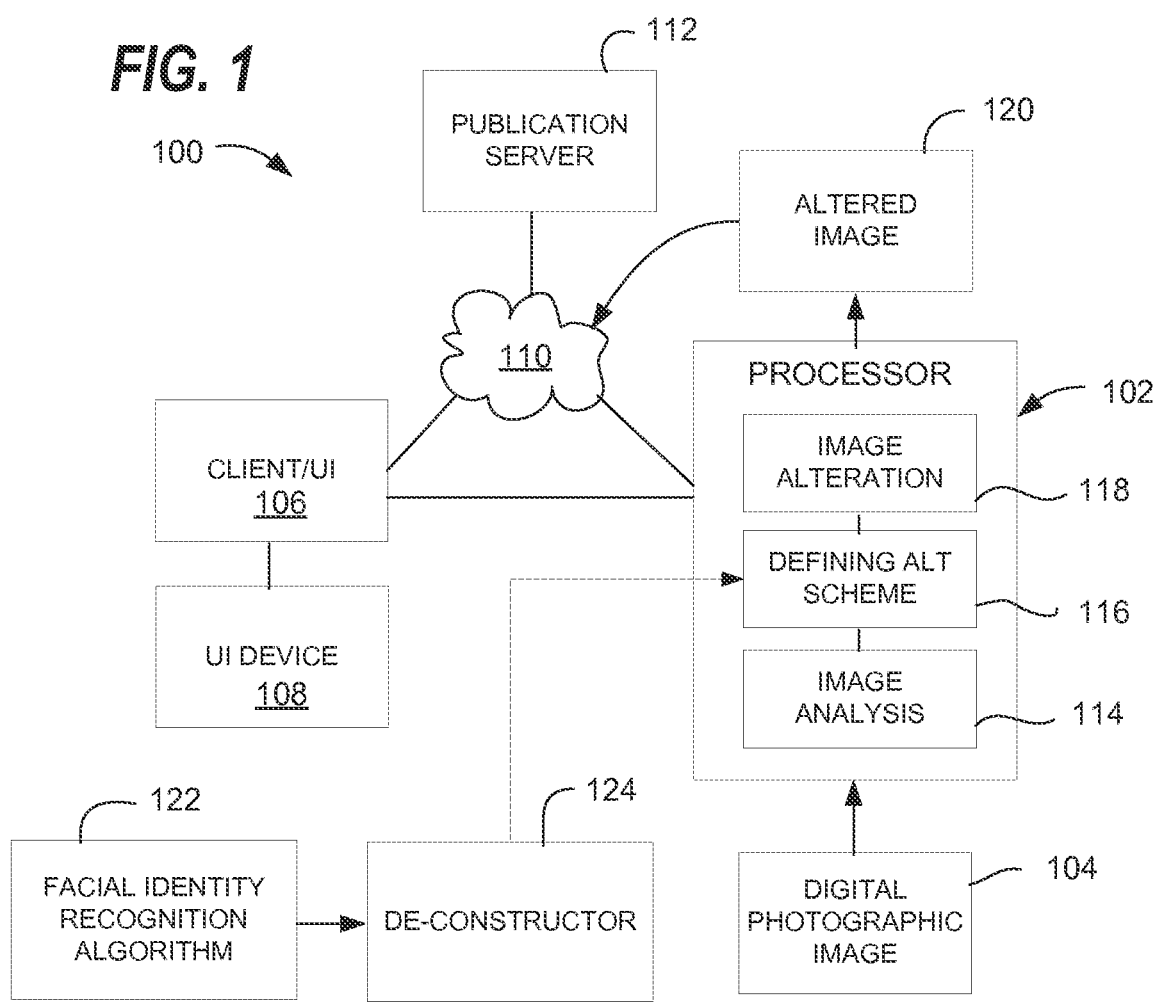
FIG. 1 is a block diagram showing an example of a system for graphic data alteration to enhance online privacy and related operations.

To improve anonymity, an apparatus may process image data to defeat the ability of automated programs to identify faces or other elements. Image data may be provided in a great variety of formats, for example, TIFF, GIF, JPEG, MPEG, and so forth, which may include both still images or video frames. The present technology is not limited to a particular image data format. The present technology may include a method wherein the same criteria utilized by a computer performing automatic analysis of images to identify faces (i.e. distance between pupils, distance from tip of nose to ears, similar metrics) to trick the identification software. The technology may include a image alteration method similar to those used in Photoshop's™ "Puppet Warp", "Liquify", or other manipulation techniques to introduce minor modifications to the facial or other photographic characteristics, for example body characteristics or even vehicle, house, or other object characteristics when attempting to keep such photographs "private". In such methods, the amount of alteration may be automatically controlled according to techniques as disclosed in more detail herein to achieve anonymity without sacrificing a desired overall aesthetic quality for an image. In an example, one might take a photograph of a 9 year old daughter, submit it to the program, elect a "moderately aggressive" obscuration level, and the program would slightly enlarge the distance between her eyes, reduce slightly her nose and ear size, slightly shorten her chin and plump her lips. The more aggressive the modifications, the more likely the changes would cause a noticeable (to humans) alteration in appearance, but the billions of photographs online provide such a large database to compare to that even changes small enough to be imperceptible to the human eye may often be sufficiently significant to a computer program to cause it to be unable to identify an altered image as being of the same person as an unaltered image. Alterations may need to be more aggressive as computing power and recognition algorithms improve, or if there is a need to defeat recognition within a smaller subset of photos, for example, within a geocoded group of photos taken within a limited geographic area. The aggressiveness of the alterations may be set manually, or automatically depending on the metadata or other indicia of uniqueness within the photograph.

To add to the anonymity, text accompanying photographs can optionally be scrambled and made non-searchable by scrambling the middle letters. Humans are capable of reading sentences where the letters in each word are all present, the first and last letter are in proper position, but the remaining letters are randomized. For example, "Hnumas are calabple of rdeanig seetnnces whree the leettrs in ecah wrod are all psenret". This may be done in conjunction with facial alteration, or independently of it.

In addition, identical alteration schemes may be applied for each of a group of photos. This way, for example, all public photos of Congressman Smith might be identically altered (i.e. eye distance increased by 4%, nose size reduced by 2%, etc), so that photos within a group would be associated by automated identification software. One searching for Congressman Smith photos would then be able to find all of the altered photos as identified with appropriate text or tags in the contextual web page, but would not be able to find the unaltered "frank smith" photos. This kind of grouping would reduce the chance that an unaltered photo would be seen as similar to an altered photo. That is, a set of randomly altered photos might fit into a resulting continuum of alterations done around a common feature set, namely the metrics of the original unaltered photo, thereby increasing the risk that that the photos could at least in theory be identifiable as belonging to the same group. By applying systematic alterations to a group of photos, a photo publisher may in essence generate a new "median" common feature set for the person at issue. As used herein, a "scheme" means an algorithm including a set of parameters that may be varied to control how the algorithm operates, and may sometimes be used interchangeably with "algorithm."

FIG. 1 shows a system 100 including a client or user interface component 106 connected to an image processor 102, directly or via a WAN cloud 110. The processor 102 may be, or may include, one or more computer processors, for example multi-core or single-core processors sold under various product names from suppliers such as Intel™, AMD™ and others. The user interface component may receive digital signals from a user interface device 108, for example a touchscreen, keyboard, camera or microphone, derived from physical user input. The image processor 102 may comprise various components or modules 114, 116 and 118, which may be coded in hardware, firmware, software, or some combination of the foregoing. Accordingly, the modules 114, 116 and 118 may be, or may include, a computer memory or non-transitory computer-readable medium holding instructions executable by the processor 102 to cause an image alteration apparatus to perform one or more operations of the methods disclosed herein. The modules 114, 116 and 118 coupled to the processor 102 may include means for image analysis, means for defining an alteration scheme, and means for image alteration. Each of said means may include the processor 102 operating an algorithm, according to more detailed aspects of algorithms and/or data processing or input/output operations as disclosed elsewhere herein. In addition, the processor 102 may receive information from a de-constructor module 124, which may be included in programming for the processor or linked to it via a link from an external device.

One or more digitally encoded photographic images 104 from any suitable source may provide input for system 100. An image 104 may be provided to the processor 102 by any suitable method, for example by uploading from a remote client or downloading from a remote storage or cloud storage resource. Generally, the image should be unpublished to a public forum at the time it is provided to the processor 102 for alteration, because a purpose of the alteration is to protect the privacy of persons or personally-identifiable objects appearing in the image 104. In an embodiment, a purpose is to prevent an automatic facial or personal recognition algorithm from recognizing the identity of specific persons or places appearing in the image 104.

To this end, the de-constructor (i.e., reverse engineering) component 124 may operate independently to determine one or more recognition boundaries of an applicable recognition algorithm 122. "Recognition boundaries" may be, or may include, a parameter set for applicable metrics that is defined by a set of parameter range values outside of which the recognition algorithm cannot recognize the identity above the defined minimum confidence level. The recognition algorithm 122 may generally be considered to be a "black box" under the control of an entity independent of any operator of processor 102. Thus, use of the de-constructor assumes that it is not possible to directly determine how the recognition algorithm 122 operates; for example, if source code for the algorithm 122 is available to the operator of the image processor 102, there may be no need to operate a de-construction component 124.

The deconstruction component 124 may determine recognition boundaries by submitting a collection of images to the algorithm, including images of the same person or place in which details have been altered by varying amounts, then using the algorithm to identify matches against an unaltered photograph of a person or place. Results of the search returned by the recognition algorithm 122 may be analyzed to determine how much alteration is needed to renter a person or face unrecognizable to the algorithm, optionally as a function of the amount of image data searched. Analysis results may be compiled to prepare data for use by a module 116 for defining an alteration scheme. De-construction may be performed automatically, semi-automatically, or manually.

The processor component 102 may include a component 114 for performing image analysis. The component 114 may automatically or semi-automatically identify objects appearing in the digital image. For example, the photograph 102 may be digitally analyzed to identify one or more faces appearing in the image, and then via the user interface 106 solicit and receive user input selecting one or more of the faces for alteration. Similarly, the application may identify recognizable text appearing in the image 104, and receive user input via the user interface 106 designating one or more text areas for alteration.

The processor component 102 may also comprise a component 116 for defining an alteration scheme for altering selected portions of an image 104. The alteration scheme may be defined in response to user input and using information available for the applicable recognition algorithm or data set size to provide a specified level of confidence that, after alteration, the object will not be recognized by the recognition algorithm operating on the assumed data set and an overall aesthetic quality of object will be preserved. Default present values may be provided upon program initialization, and users may be enabled to change default values via the user interface 106. For example, a default confidence level for non-recognition may be set at 98%, and a user may change this to any desired value, for example 99.99% or 90%. In general, lowering the confidence level will result in less alteration of the image and raising the confidence level will result in greater alteration of the image. Accordingly, by raising or lowering a specified confidence value via a user interface to the alteration scheme component 116, a user may directly control an amount of overall aesthetic quality to preserve. In addition, alteration schemes may be configured to alter image metrics that are likely to be effective in preventing automatic recognition algorithms from recognizing a person or place appearing in a photograph, without causing a human who knows the person or place to be confused—or even to notice the alteration at all. The alteration scheme may include randomly selected elements or parameters, for example parameters randomly selected from a defined range of possibilities.

The image processor 102 may further comprise an image alteration component 118 for altering the image in according with a selected alteration scheme. Digitally this may be accomplished by translating and/or stretching selected parts of the image to be altered using an automatic alteration algorithm, in amounts defined by the alteration scheme, to provide an altered image 120. The altered image 120 should not contain information that would enable restoration of the original image 104 by anyone not possessing the original. For example, the altered image should be scrubbed of any metadata indicating what alterations were made and should not include any tell-tale artifacts indicative of particular alterations. Such artifacts may be avoiding by using a well-designed alteration algorithm that introduces random or quasi-random variability in altered pixel values, so that altered pixel values are not rigidly determined by adjoining unaltered pixels appearing in the image 120. The altered image may be stored in a memory device or non-transitory computer-readable medium, and/or provided to a user-specified client 106 or server 112 via a WAN 110.

Figure 2:
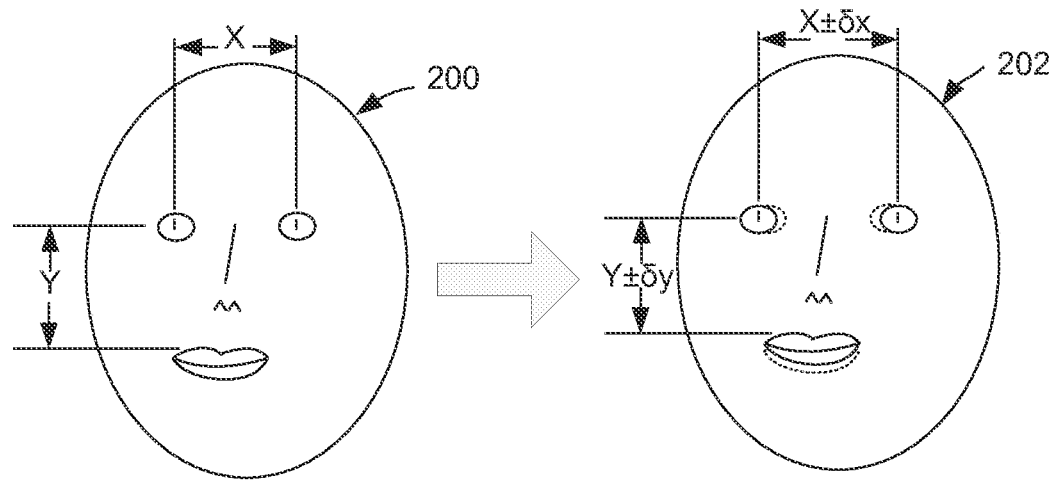
FIG. 2 is a diagram illustrating concepts related to facial recognition.

FIG. 2 provides a simple example of facial feature alteration using dual metrics 'X' and 'Y' appearing in an unaltered facial image 200 and, after alteration, in an altered facial image 202, for a metric number M In should be appreciated that in an actual facial alteration, dozens or hundreds of metrics may be involved, for example, M may be in the range of about 10 to 1000. The example metric X defines a center-to-center distance between the eyes and the example metric Y defining a distance between the upper edge of the lips and the center of the eyes. In the altered facial image 202, pixels have been manipulated to change the distance between the eyes X by an amount '$\partial x$' and the distance Y by an amount '$\partial y$.' The altered face may be characterized by a sum of absolute values of 'i' metric changes or M number of metrics as follows:

$$\Delta = \sum_{1 \text{ to } M} \partial i$$

Generally, it may be desirable to minimize the value of $\Delta$ by finding the lowest value that will effectively prevent automatic object recognition with the desired confidence level over the anticipated image data set, while applying alterations to a large enough M so that each alteration is very slight. That is, M may be maximized to the effective limit defined by the applicable recognition algorithm, which includes all metrics used for recognition, while $\Delta$ is minimized by altering each metric as little as possible. Of course, increasing M reduces computational efficiency, so the alteration scheme should not increase M beyond that needed to prevent automatic recognition while preserving the aesthetic qualities of the image to its intended audience. In addition, color or texture of skin tone and eyes may also be altered, or text may be scrambled as described above.

Aesthetic qualities, and a permissible amount of alteration that preserves overall aesthetic quality, are subjectively determined by an individual or group. These parameters can be systematically measured using a heuristic learning process based on user feedback, and may remain fairly stable over time for a given person or group. Thus, an image processing apparatus may determine a level of $\Delta$, M and/or $\partial i$ so as to preserve overall aesthetic quality of an image according to preferences of a person or group.

Figure 3:
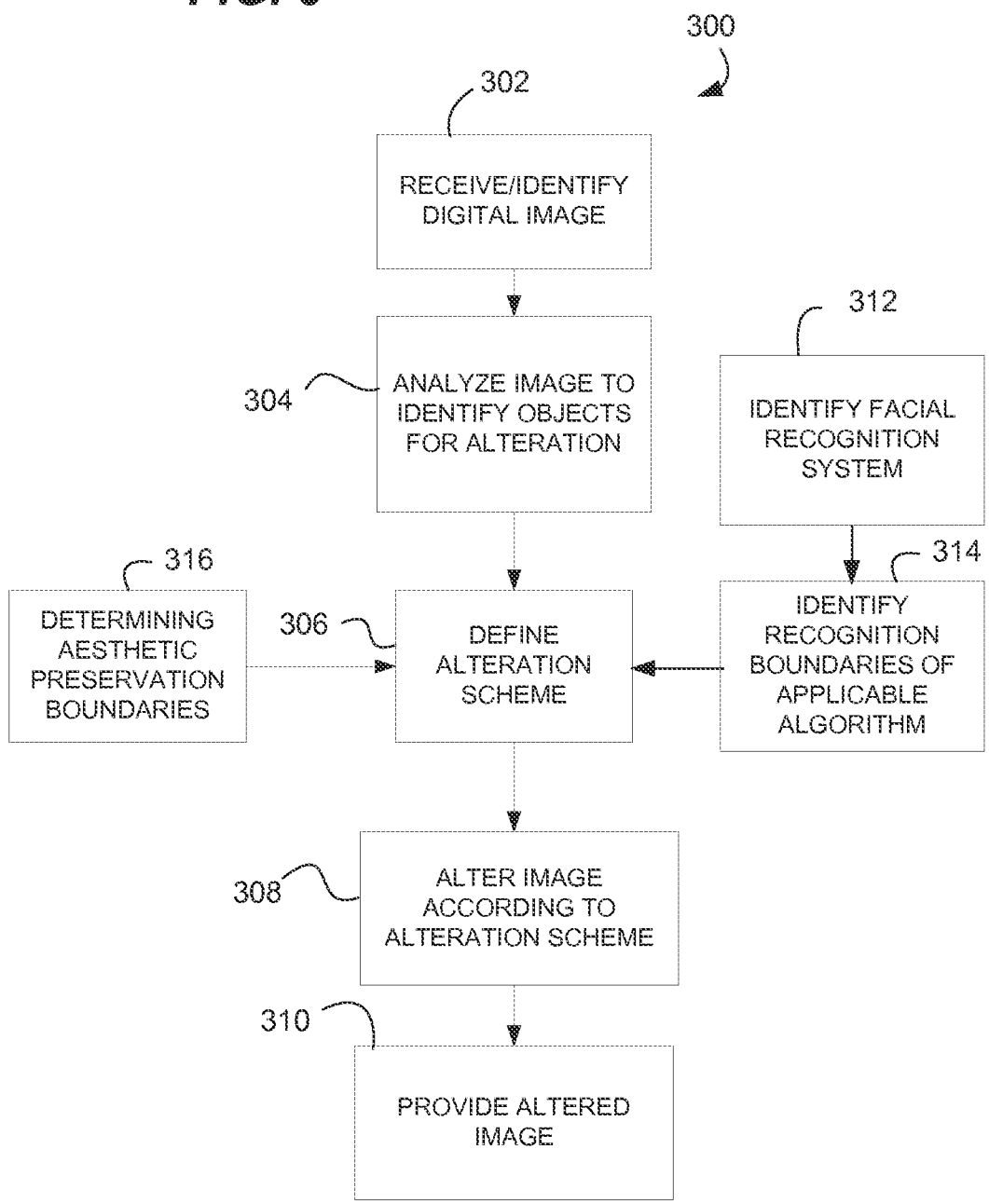
FIG. 3 is a flow chart showing an example of a method for graphic data alteration to enhance online privacy.

FIG. 3 is a flow chart showing an example of a method 300 for altering an image to prevent automatic recognition. At 302, the method may include receiving a digitally encoded image for alteration at a processor, or accessing the image identified by a user in a database. At 304, the processor may analyze the image to identify objects, such as faces, text, or locations, to be altered. Any suitable analysis method may be used. At 306, the processor may define an alteration scheme, to effectively prevent automatic recognition of the object to be altered without noticeably impairing the aesthetic of the image for its intended audience. For example, the processor may operate to apply a minimum effective $\Delta$ over a suitable large number M of metrics. In addition, or in the alternative, the processor may determine parameter sets for recognition boundaries and quality preserving boundaries, and base the alteration scheme on a set difference of the aesthetic quality preserving parameters and the recognition boundary parameter values.

Independently, the processor or a different processor may identify 312 one or more automatic facial recognition algorithms that are to be defeated, and using an iterative testing process, identify recognition boundaries 314 of the applicable algorithm. These boundaries may be parameterized and used for defining the alteration scheme 306. The operation summarized at block 314 may include identifying a recognition parameter set based on an object (e.g., facial) recognition algorithm, wherein the recognition parameter set is defined by a set of parameter range values outside of which the recognition algorithm cannot recognize the identity above a defined minimum confidence level. In such case, the method 300 may further include at 306 defining parameter values for the alteration algorithm used in the altering of the image within the recognition parameter set.

In addition, the method 300 may further include at 306 controlling at least one parameter of the alteration algorithm so as to preserve an overall aesthetic quality of the image as determined by an aesthetic quality measuring algorithm to above a defined minimum preservation level. The aesthetic quality measuring algorithm may be a heuristically trained algorithm that has previously been trained by user feedback over a sample set of images. The alteration scheme may adopt parameter values designed to cause the alteration to preserve a designated amount of overall aesthetic quality of an image while obscuring an identity of at least one object appearing in the image to a designated recognition process. The designated amount of quality preservation may be determined directly in response to user input, for example by receiving user input indicating a minimum confidence level that the alteration will effectively defeat an automatic recognition process. In the alternative, the designated amount of aesthetic quality preservation may be automatically determined using a predictive algorithm as described herein, optionally a heuristic algorithm, and optionally using set operations with a recognition parameter set to define parameter values for the image alteration.

In an aspect, the method 300 may further include, at 316, identifying an aesthetic preservation parameter set based on the aesthetic quality measuring algorithm, wherein the aesthetic preservation parameter set is defined by a set of parameter range values outside of which the aesthetic quality measuring algorithm determines that the aesthetic quality of the image has changed in an amount that exceeds the defined minimum preservation level. The method may further include, at 306, determining a third set of parameter values by a set difference of the aesthetic preservation parameter set and the recognition parameter set, wherein the set difference is defined as parameter values that are members of the aesthetic preservation parameter set and are not members of the recognition parameter set.

Figure 4:
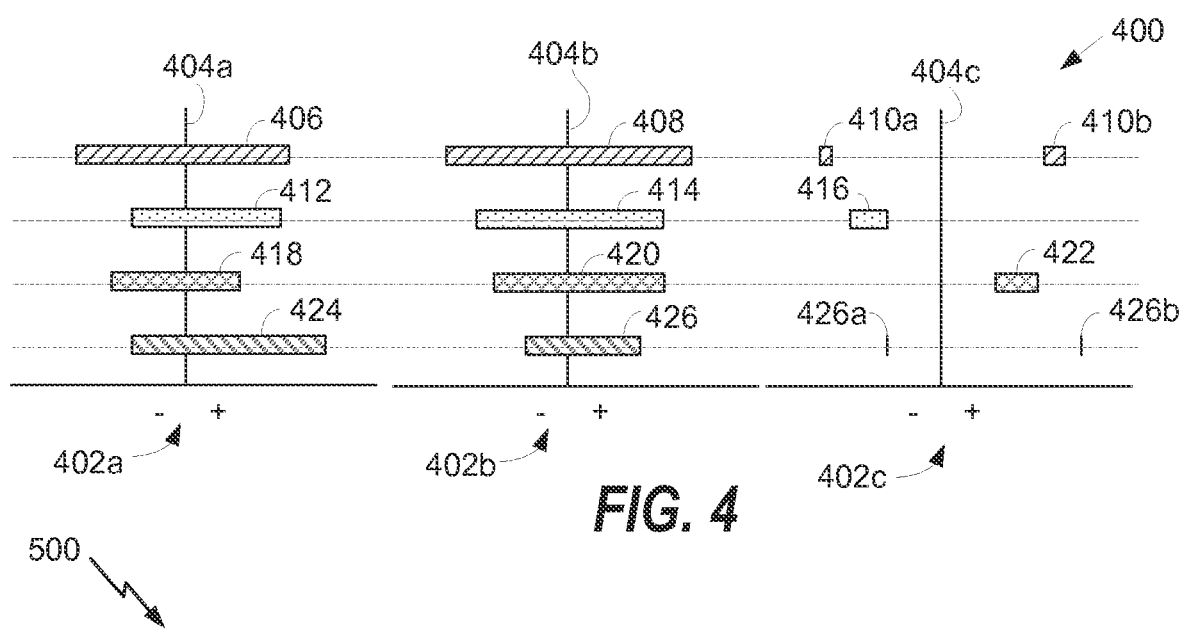
FIG. 4 is a diagram illustrating aspects of set operations for determining parameters of an image alteration algorithm for preserving an overall aesthetic quality of an image and obscuring an identity of at least one object appearing in the image.

An example of such set relationships is presented in FIG. 4, illustrating aspects of set operations 400 for determining parameters of an image alteration algorithm for preserving an overall aesthetic quality of an image and obscuring an identity of at least one object appearing in the image. It should be appreciated that the illustrated set operations are simplified for clarity of example, and that in the practice of the method, the set operations would involve determining many more parameter values and processing many more set operations than would be practicable except by a computer that is programmed according to the teaching herein. Accordingly, it should be apparent that such a computer should be used to perform the computational operations described herein for determining parameters of an image alteration algorithm that preserve an overall aesthetic quality of an image while obscuring an identity of at least one object (e.g., person or geographic location) appearing in the image.

A first parameter set 402a represents a recognition boundary for a particular recognition process, e.g., a facial recognition algorithm. The parameter set includes a set of parameter value ranges 406, 412, 418 and 424 arranged around a baseline 404a. These ranges represent pictorially an amount by which parameters of an image feature (e.g., an image of a person's face) can be altered without rendering the image feature unrecognizable by the applicable recognition process. Each range of parameter values 406, 412, 418 and 424 may include values greater than (+) or less than (−) the baseline 404a, which represent the measured actual value. The baseline value 404a is generally different for each parameter, and the center value and width of the range relative to the baseline may vary for each parameter. For example, parameter 406 may represent the distance between the top of the head and the lower jaw, with a baseline value of ten inches for a particular individual; parameter 412 may represent a distance between the eyes with a baseline vale of four inches for the individual, parameter 418 may represent the distance between the upper and lower eyelid, with a baseline value of 0.5 inch for the individual, and 424 may represent ratio of face width to length, with a baseline value of 0.8, as so forth. These examples are merely for illustration and are not intended to represent preferred or typical values.

A second parameter set 402b represents an aesthetic quality preservation boundary set corresponding to the same parameters illustrated for set 402a. The parameter values 408, 414, 420 and 426 represent a range of values respectively corresponding to the same measures 406, 412, 418 and 424. However, the parameter values in set 402b are generated as aesthetic preservation parameter set based on an aesthetic quality measuring algorithm, wherein the aesthetic preservation parameter set is defined by the set of parameter range values 408, 414, 420 and 426 outside of which the aesthetic quality measuring algorithm or user input determines that the aesthetic quality of the image has changed in an amount that exceeds a defined minimum preservation level.

A third parameter set 402c represents a set difference of set 402b and 402a. The set difference may be defined as parameter values 410a, 410b, 416 and 422 that are members of the aesthetic preservation parameter set 402b and are not members of the recognition parameter set 402a. In some cases a parameter value difference may result in a null result, for example where a preservation parameter value range 426 in set 402b lies entirely within its corresponding recognition parameter value range 424 in set 402a. In such cases, an alteration scheme definition process 306 may select one of the values 426a or 426b just outside the recognition parameter range 424, or may select the baseline value at 404a, or may select some value within the range 426. It is anticipated that using a much larger number of parameters should usually obviate the need to alter the image with respect to every parameter, and many parameters may be left unaltered or minimally altered to the extent not needed to obtain a desired confidence level of defeating a known maximally effective recognition algorithm. In selecting parameter values for image alteration, the definition process 306 may use a Monte Carlo method or similar statistical/iterative process to identify a set of alteration parameter values that are most likely to defeat known recognition algorithms in the anticipated publication space for the altered image, while resulting in a minimal change in the image aesthetic quality—thereby minimizing the perceived change in quality experienced by the intended target audience.

Referring again to FIG. 3, at 308, the processor may alter the image according to the defined alteration scheme to produce an altered image using an alteration algorithm, so that all metrics M selected for alteration are irrecoverably changed in the altered image. At 310, the processor may transmit or otherwise provide the altered image to a specified destination, including but not limited to storing the altered image in a computer memory. As noted image data may be stored in a great variety of data formats, e.g., JPEG, TIFF, GIF, etc., and any suitable format may be used.

Figure 5:
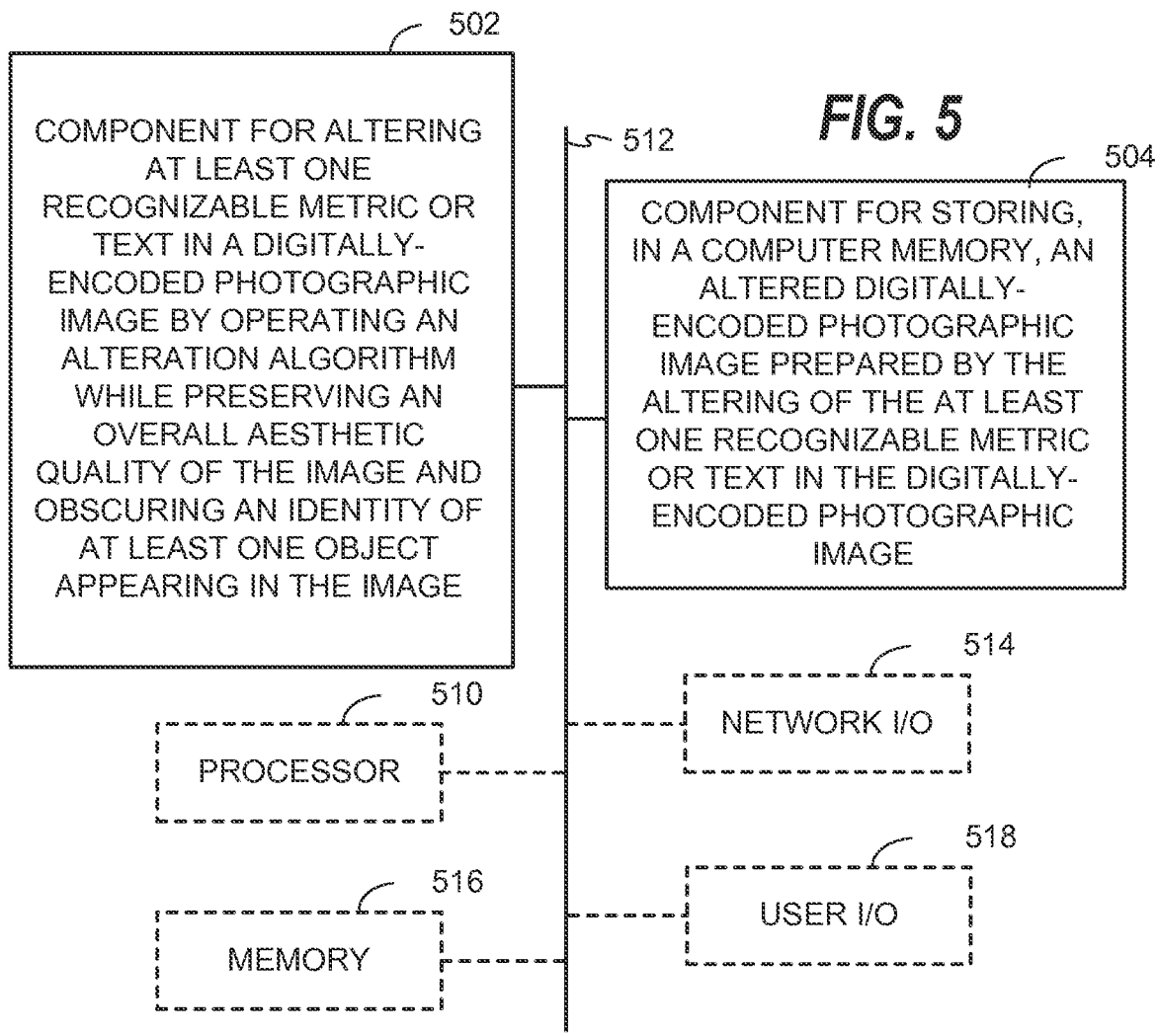
FIG. 5 is a block diagram illustrating aspects of an apparatus for performing a method as shown in FIG. 3.

With reference to FIG. 5, there is provided an exemplary image processing apparatus 500 that may be configured as a client or server computer, or as a processor or similar device for use within the computer. The apparatus 500 may include functional blocks that can represent functions implemented by a processor, software, or combination thereof (e.g., firmware). As illustrated, in one embodiment, the apparatus 500 may comprise an electrical component or module 502 for altering at least one recognizable metric or text in a digitally-encoded photographic image by an alteration algorithm while preserving an overall aesthetic quality of the image and obscuring an identity of at least one object appearing in the image. The component 502 may be, or may include, a control processor coupled to a receiver and to a memory, wherein the memory holds encoded instructions for the algorithm using parameters selected to preserve an overall aesthetic quality of the image while obscuring an identity of at least one object appearing in the image. The component 502 may be, or may include, a means for altering at least one recognizable metric or text in a digitally-encoded photographic image by an alteration algorithm while preserving an overall aesthetic quality of the image and obscuring an identity of at least one object appearing in the image. Said means may be, or may include, the at least one control processor operating an algorithm. The algorithm may include receiving image data in response to a user input, receiving further user input designating one or more parameter values for image alteration, retrieving parameters from a heuristic learning module designed to obscure the object while preserving overall aesthetic image qualities, and processing the image data to obtain altered image data based on selected values of the parameters. The algorithm may, in the alternative or in addition, include one or more of the detailed operations 312-316 discussed above.

The apparatus 500 may comprise an electrical component 504 for storing an altered digitally-encoded photographic image prepared by the altering of the at least one recognizable metric or text in the digitally-encoded photographic image in a computer memory. The component 504 may be, or may include, a control processor coupled to a memory, wherein the memory holds encoded instructions for causing the apparatus to store output from the image alteration algorithm in a designated computer memory. The component 504 may be, or may include, a means for storing an altered digitally-encoded photographic image prepared by the altering of the at least one recognizable metric or text in the digitally-encoded photographic image in a computer memory. Said means may be, or may include, the at least one control processor operating an algorithm. The algorithm may include receiving image data processed by the image alteration algorithm, configuring the altered data according to a selected file format, and storing a resulting image file in a selected computer memory.

In related aspects, the apparatus 500 may optionally include a processor component 510 having at least one processor. The processor 510 may be in operative communication with the components 502-504 via a bus 512 or similar communication coupling. The processor 510 may effect initiation and scheduling of the processes or functions performed by electrical components 502-504 and similar components.

In further related aspects, the apparatus 500 may include a network interface component 514 for sending and receiving data over a network, such as computer network or communications network. The apparatus 500 may further include user input/output components 518, for example, a touchscreen display, or non-touch sensitive display with a keyboard, microphone, pointing device, or other separate user input device. The apparatus 500 may optionally include a component for storing information, such as, for example, a memory device/component 516. The computer readable medium or the memory component 516 may be operatively coupled to the other components of the apparatus 500 via the bus 512 or the like. The memory component 516 may be adapted to store computer readable instructions and data for effecting the processes and behavior of the components 502-504, and subcomponents thereof, or the processor 510, or any of the operations of the methods disclosed herein. The memory component 516 may retain instructions for executing functions associated with the components 502-504. While shown as being external to the memory 516, it is to be understood that the components 502-504 can exist within the memory 516.

In view of the exemplary systems described supra, methodologies that may be implemented in accordance with the disclosed subject matter have been described with reference to one or more flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein, or methodologies may include additional operations that are described herein without being illustrated.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes computer storage media and temporary memory media. A storage medium or memory medium may be any available medium that can be accessed by a general purpose or special purpose computer via an electronic, optical, magnetic, or other media reader. By way of example, and not limitation, such computer-readable media may comprise RAM, ROM, EEPROM, CD-ROM, BluRay or other optical disk storage, magnetic disk storage or other magnetic storage devices, or any other medium that can be used to hold or store desired program code means in the form of instructions or data structures and that can be accessed by a general-purpose or special-purpose computer, or a general-purpose or special-purpose processor.

The following numbered examples illuminate certain aspects of the present technology. The scope of the present technology may extend beyond these examples in both details and generalities, as disclosed by the foregoing description.

In addition to recognition of faces, locations, and text in still and moving images, the change between video frame images may be utilized to identify a person. Furthermore, motion may also be analyzed by radar, sonar, Forward Looking Infrared imaging, infrared imaging, audio analysis (for example, of the sound of footfalls), and other analysis tools. In addition, video is often accompanied by voice, which makes possible voice recognition.

Furthermore, such analysis may be utilized not only to identify a person, but also to identify behaviors or even the truthfulness of a person. As described at http://www.clarkfreshman.com, micro-expression analysis may be utilized to determine the likelihood that a person is being truthful. Automated facial micro-expression analysis is also being developed, as described in Yee-Hui et. Al. "A Survey of Automatic Facial Micro-Expression Analysis: Databases, Methods, and Challenges", published in Frontiers in Psychology Vol. 9, 2018.

These inventions may be implemented in software that modifies video. Another method for implementation of certain of these inventions is clothing using a Clothing Display, which we define as a method to create the illusion of movement, or to change, eliminate, or camouflage movement, stance, or body appearance on a person (although called Clothing Display, it may also be used to create an illusion of movement or lack thereof on an object, and such use is included herein as well). The Clothing Display may comprise a flexible display, images projected onto clothing or flesh, radar blocking or alteration technology, sonar blocking or alteration technology, projection of a person or object between an observing camera and a person, or other methods of creating an image on or near an object. It may also comprise clothing designed to absorb and/or scatter sound, light or radiation. Although we call it a "Clothing Display" and use it herein in the context of a moving person or object and/or video of a moving person or object, certain aspects may also be used to block facial recognition. It should also be understood that "Clothing Display" may also comprise alteration of movement or other characteristics in video.

As described by Boyd and Little in a Biometric Gait Recognition in a 2005 paper:
As a biometric, gait has several attractive properties. Acquisition of images portraying an individual's gait can be done easily in public areas, with simple instrumentation, and does not require the cooperation or even awareness of the individual under observation. In fact, it seems that it is the possibility that a subject may not be aware of the surveillance and identification that raises public concerns about gait biometrics.

Gait is, of course, the movements that result in locomotion. Human gait is the movements that result in human locomotion. While this document addresses human gait, it should be understood to apply to animal gait as well.

Human gait is thought to have at least three properties that are key to human perception and identification (as described by Boyd and Little):
1. Frequency: The components of the gait typically share a common frequency;
2. Phase locking: The phase relationships among the components of the components of the gait remain approximately constant. The lock varies for different types of locomotion such as walking or running;
3. Physical plausibility: The motion must be physically plausible human motion.

In one aspect, a video of a person is obtained. For example, a system may be configured to impair automated gait analysis. Such a system would usually comprise a processor coupled to a memory, the memory encoded with instructions that, when executed by the processor, cause the system to analyze a video (and/or or sequential series of images). Those images could include objects, faces, bodies, animals and/or parts or combinations thereof.

The system would identify the objects, faces, bodies, animals and/or parts or combinations thereof, and in one aspect may further identify parts of one or more of the things identified. For example, with a video of a human walking, the system may identify the joints and/or skeleton and/or arms, legs, torso and other elements.

Continuing with the example, the system may have identified the joints and bones attached to those joints. Such identification may be accomplished using the grassfire algorithm or other methods. Once identified, the image may be altered to modify the movement of joints, limbs, bones and/or other elements utilized or useful in identifying a person, such as gait. The alteration may be made using the formula:

Obtain a minimal value of $$\Delta = \sum_{1 \text{ to } M} \bar{\partial} i$$

wherein $\bar{\partial}l$ is a measure of metric alteration each of for a number M of different movement (for example, one or more of the components that comprise gait). The method may further include selecting the number M of metrics so as to lower each applied $\bar{\partial}l$ to below a human-perceptible threshold. For example, the number M may be increased, thereby causing an increased number of alterations on a image, while the amount of each alteration is decreased. To use a simple example, instead of changing an amount of arm swing by at least 10% to prevent automatic gait recognition (i.e., M=1 and $\bar{\partial}l > \pm 10\%$), the alteration may change an amount of difference between right as opposed to left sided steps by a lesser amount, and may also change some other metric, for example the distance between the knees at various portions of a gait (e.g., M=2 and $\bar{\partial}l < \pm 10\%$).

Such a modification would impair automatic recognition of the person while preserving an overall aesthetic quality of the image, wherein $\bar{\partial}l$ is a measure of metric alteration of each of a number M of the selected facial recognition metrics.

In one aspect, the methods described in Plagemann, Ganapathi, Koller and Thrun in the paper "Real-time Identification and Localization of Body Parts from Depth Images" describes various methods to identify body parts in images, and such methods may be utilized to identify candidates for alteration.

If may further be desirable to modify captured moving and/or still images and/or sequences of images to hide, modify, and/or obscure elements that reveal cultural, behavioral, or other elements that may be undesirable. Alternatively, or in addition, desirable elements may be added by modifying the video, image, or images.

Taking as an example an orthodox Jewish person wearing a yarmulke in a promotional video. While the promotional video may be entirely appropriate to use in most of North America, imagine further that it is used as part of a presentation to a sovereign wealth fund where the sovereign has shown bias against Jews. In such a case, it may be desirable to automatically delete the yarmulke from the video or stills, or even replace it with different headwear.

As another example, in certain cultures, showing the bottom of a shoe is considered an insult. A roundtable discussion where a participant has cross his legs and is revealing the sole of his shoe may be altered so that a short, artificial podium, chair, or other object is placed in front of the participant to mask the showing of the bottom of the shoe.

As another example, it is common to show signs of physiological conditions in a video. As an example, it made national news in the United States when one of President Trump's invited guests at the 2019 State of the Union address, Joshua Trump, fell asleep during the address. Similarly, yawning, flatulence, burping or other physiological states may be captured in a still or video manner. The video may be modified by identifying behaviors and/or body parts and/or the associated movements, modifying the video and/or still image obscure or change the undesirable behavior. Using the State of the Union example, the sleeping child may be replaced with video of the child captured while awake, or the child may be removed from the video. In one aspect, the system may complete these actions by comparing the behaviors and/or other aspects of recognized images and/or persons to a database, and where the database indicates that the action is undesirable, the action may be automatically altered as described herein.

A further use of these inventions involves micro-expressions. Humans are well known to have certain difficult (or impossible) to control expressions that accompany a mental state. As an example, expert Clark Freshman was able to identify lies during a Presidential debate simply by watching the footage for micro-expressions. As described at https://www.huffingtonpost.com/entry/gop-debate-body-language_b_953564 (retrieved Mar. 4, 2019), Professor Freshman looked for contempt, which he says is "somewhat easily detected by the simple smirk or sneer." One interesting characteristic of the contempt sneer is that it is "like a smile, but only half the face seems to get involved." Professor Freshman identifies, for example, the contempt sneer on the face of Rick Perry when he was asked to comment on a report that whites have far more wealth than African-Americans. Similarly, a contempt half-smile was given by Ron Paul when he criticized Governor Perry for an executive order to offer vaccines against HPV. As the Professor further noted, even changes in the blinking rate are revealing, showing that the faster blinking rate indicates extra thinking.

Because these are micro-expressions, which are measured in milliseconds, they are very difficult for untrained humans to identify. However, it would be an easy matter, as the Yee-Hui Oh paper demonstrates, to implement a system that identifies some of these micro-expressions. If, for example, a candidate is announcing a run for President via a YouTube® video, or a public figure releases a video denying participation in an affair or other undesirable revelation, automated analysis would enable various means of displaying where the body language draws the spoken words into question. One might imagine the word "contempt" flashed on the screen when contempt is detected.

In one aspect, the inventions may be utilized to obscure such micro-expressions, either by digitally maintaining the face (or other) muscles or components in place while they move, by freezing the image, by digitally moving the hand and arm to appear to scratch the cheek, blocking the view of the area showing the micro-expression, or otherwise. Conversely, micro-expressions might be added, whether in substitution for contrary micro-expressions or on their own. For example, signs of truthfulness might be substituted for signs of contempt or lying. It is also desirable to use the formula disclosed in conjunction with the parent application to maintain a face that is recognizable and where the alteration is not obvious. When removing a micro-expression, the portions of the face that did move as part of the micro-expression may be kept substantially in the same place relative to the rest of the face. In one aspect, a new micro-expression may be added without regard to whether an existing micro-expression is present.

In another aspect, voice analysis may be utilized to identify a person. In one aspect, an audio source, whether or not accompanied by video, may be modified to alter the voice characteristics and therefore obscure the identity of the person. When done in conjunction with a video, it is preferred if mouth movements are altered to properly match any changes to voice cadence or other changes that would impact the synchronization between the sound and the movement of the mouth and other image elements.

One infirmity of the various methods, processes, and devices described throughout the specification (and not just in the "Continuation In Part" section) is that such of the image alteration (excluding those alterations done in real time and projected or otherwise mapped onto the body or object or face, as further described below) cannot be accomplished as described without access to the video or photographic data. That is, while a video or still image captured on a user's cell phone may be processed, a video or still image captured by a government-operated camera is put into the possession of the government entity prior to any modifications made pursuant to the inventions herein.

It is therefore desirable to modify the images captured by third party cameras (although it could be done for cameras in control of the user) by modifying how the user is seen (which we discuss this in conjunction with gait recognition, it should be understood that it may be utilized with any of the elements discussed herein, such as micro-expressions or face recognition). Such modifications may be done in a limited light frequency range, such as those areas just at the edge or just past the edge of human visual perception. These would comprise light outside (or close to outside) of the 390 to 700 nanometer range. To be effective, the light would need to be within the range captured by most commercial cameras, which are typically capable of imaging light outside of the human spectral range.

Less bright light within the human spectral range may also be utilized, in order to minimize human perception of the light used to fool image recognition software. Alternatively, light could simply be used without regard to perceptibility by humans and/or could be camouflaged as fashion, camouflaged within other projected patterns, or otherwise.

In one aspect, joints and bones may be moved virtually by using Light Projection. We define Light Projection herein as using a modality capable of creating an image that overlays the person or object of interest and/or an area proximate to them. This can be accomplished utilizing clothing with flexible displays or other means of displaying images or light on clothing, and/or by using one or more pico projectors or other projectors to project an image onto the person or object, and/or by other methods.

In another aspect, Light Projection may target the ground, walls, or other areas proximate to the person whose gait is to be obscured. For example, by using Light Projection on the ground around a person, a camera incapable of seeing three dimensions would have great difficulty distinguishing images of many walking people from the actual walking person. Similarly, images of many walking people may be projected onto a wall where the person seeking gait anonymity may be walking near. In one aspect, these projected images match the gait of somebody of greater interest than the subject (for example, a wanted criminal). In another aspect, those projected images match the gait of the subject and may be projected traveling in different directions, preventing automated alerts as to the direction the subject is moving.

In another aspect, Light Projection may be used to project a different gait onto a third party. For example, Joe may have a projector that projects his gait onto Jane's legs.

In one aspect, movement may be addressed in a manner where automated gait (and other) analysis is substantially impaired by utilizing reflective, mirror-like clothing. In one aspect, the mirrors are located in at least one of the areas used for gait recognition. In another aspect, clothing elements are added that are capable of scattering and/or obscuring radar and/or sonar imaging.

In another aspect, clothing may be heated and/or cooled using a pattern that makes heat-based (such as FLIR) image recognition unreliable. For example, the heat pattern of a face may be rendered below the arms of a person, causing the system to believe that the gait is associated with a person far shorter than the person of interest. Similarly, behaviors associated with heat, such as smoking, may be obscured from view at least in part by causing the clothing to have "hot spots" that are similar to those associated with a burning cigarette. In one implementation, the hot spots may move, preventing an automated image recognition system from looking only for moving hot spots to identify smoking behaviors.

In another aspect, mechanical elements may be placed on the body (in a preferred implementation, under at least one layer of clothing). Those elements may move in a random way for each step, in a systematic way that is randomly set, in a systematic way that imitates characteristics of another, or otherwise. The elements may be controlled by a microprocessor. In another aspect, elements may be manually set and controlled.

The mechanical elements are preferentially (though not necessary) placed near joints and extend above and/or below the joint. To break automated gait analysis, the mechanical joint is placed at a spot not directly over the human joint. They are also preferentially (though not necessarily) made to have a bendable joint-like element and/or have extensions above and/or below the joint-like element. This allows the appearance of a joint that is moving in a different place and a different manner than the actual joint. Movement of the actual joint may be obscured entirely using the mechanical elements and extensions below and/or above the joint. Alternatively, movement of both joints may be visible, creating substantial confusion in AI and other systems designed to do image recognition.

In another aspect, it may be desirable to exempt certain people from image and/or body and/or movement recognition. For example, the United States has preferred traveler programs and airport security programs that allow users to undergo substantially less inspection and questioning based on a pre-screening process. Persons who undergo a pre-screening process may be given a method, such as an RFID tag, a bar or QR code, a phone or device-borne transmitter, or may be placed in a database of faces and/or movements that are not to be tracked. Under those circumstances, persons willing to be prescreened may preserve their privacy.

What is claimed is:

1. A system to impair automated moving image analysis, comprising:
a processor coupled to a memory, the memory encoded with instructions that when executed by the processor, cause the system to:
analyze a digitally-encoded moving image comprising one or more persons walking;
apply a Clothing Display to at least one person to alter an apparent gait of the person using an alteration algorithm that identifies an alteration of gait metrics based on a value of:

$$\Delta = \sum_{1 to M} \overline{\partial i}$$

to substantially reduce risk of automatic recognition of the apparent gait while preserving an overall aesthetic quality of the apparent gait, wherein $\overline{\partial i}$ is a measure of metric alteration of each of a number M of the gait metrics; and
store in the memory, an altered digitally-encoded image.

2. The system of claim 1, where the Clothing Display comprises a flexible display worn by a person.

3. The system of claim 1, where the Clothing Display comprises images projected onto clothing of the person by at least one projector.

4. The system of claim 1, where the Clothing Display comprises projection of a person or object between an observing camera and the person.

5. The system of claim 1, where the Clothing Display comprises using at least one radar-scattering clothing element worn by the person wishing to avoid gait analysis.

6. The system of claim 1, where the Clothing Display comprises using at least one sonar-scattering clothing element worn by the person wishing to avoid gait analysis.

* * * * *